United States Patent
Bennett et al.

[11] Patent Number: 6,040,088
[45] Date of Patent: Mar. 21, 2000

[54] SODIUM POLYACRYLATE GELLING AGENT FOR ZINC GELLED ANODE

[75] Inventors: Patricia S. Bennett, Madison; Kenneth H. Kenyon; Ronald J. Ekern, both of Verona; Janna L. Rose; Josie B. Wieser, both of Madison, all of Wis.

[73] Assignee: Rayovac Corporation, Madison, Wis.

[21] Appl. No.: 08/837,405

[22] Filed: Apr. 15, 1997

[51] Int. Cl.[7] .................................................. H01M 4/24
[52] U.S. Cl. .......................... 429/229; 429/206; 429/207
[58] Field of Search ................................. 429/190, 206, 429/229, 230, 232

[56] References Cited

U.S. PATENT DOCUMENTS

| | | | |
|---|---|---|---|
| 3,207,633 | 9/1965 | Meltzer et al. | 136/83 |
| 4,673,704 | 6/1987 | Flesher et al. | 524/519 |
| 4,778,836 | 10/1988 | Farrar et al. | 524/35 |
| 4,963,447 | 10/1990 | Nishimura | 429/206 |
| 5,168,018 | 12/1992 | Yoshizawa et al. | 429/190 |
| 5,401,590 | 3/1995 | Chalilpoyil et al. | 429/59 |
| 5,587,254 | 12/1996 | Kojima | 429/206 |
| 5,686,204 | 11/1997 | Bennett et al. | 429/217 |
| 5,721,068 | 2/1998 | West | 429/190 |

FOREIGN PATENT DOCUMENTS

| | | |
|---|---|---|
| 0 414 990 A1 | 3/1991 | European Pat. Off. . |
| 0 678 927 A1 | 4/1995 | European Pat. Off. . |
| WO 96/23581 | 8/1996 | WIPO . |

*Primary Examiner*—Maria Nuzzolillo
*Assistant Examiner*—Monique Wills
*Attorney, Agent, or Firm*—Quarles & Brady LLP

[57] ABSTRACT

A sodium polyacrylate superabsorbent polymer made by bulk polymerization and characterized as described herein is a superior gelling agent when provided at a suitable concentration in a gelled anode for an alkaline electrochemical cell. Suitable gelled anodes, alkaline electrochemical cells containing such gelled anodes, and methods for making and using same are also described.

26 Claims, 1 Drawing Sheet

SODIUM POLYACRYLATE GELLING AGENT FOR ZINC GELLED ANODE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The basic structure of a primary alkaline electrochemical cell is known. Generally speaking, alkaline cells include a positive electrode ("cathode") that receives electrons from a negative electrode ("anode") that releases electrons. The cathode is joined to a positive terminal of the battery by a collector rod. The negative electrode is typically a high-surface area metal such as zinc. The anode metal is provided in an electrolyte solute, such as potassium hydroxide, which is the ion transfer medium between the anode and the cathode. A separator which passes ions, but not electrons, is placed between the electrodes. Other aspects of a typical alkaline cell are described elsewhere in the specification.

It is common in the art to provide a gelled anode wherein the gelled portion includes the anode metal, provided as a powder, an aqueous alkaline electrolyte, and a gelling agent for fixing the anode metal and electrolyte in the gel state. Conventional gelling agents include carboxymethylcellulose, crosslinking-type branched polyacrylic acid, natural gum, or the like. A typical anode metal is zinc powder.

When formulating a gelled anode, it is important to ensure that the anode remains dispersed in the gel and that the gel retains its integrity. If dispersion is reduced or if the gel experiences syneresis, the effective surface area of the anode is reduced and the anode network required for efficient ion transfer is interrupted. Contact among the particles of an anode network, or between the anode particles and the cathode current collector, can also be reduced or interrupted when an alkaline cell is dropped, jostled, or vibrated. This shock sensitivity is a particularly well known problem of mercury-free alkaline cells employing crosslinking-type gelling agents. Shock sensitivity can result in a high internal resistance, a rapid decrease in cell voltage, and other problems, all of which are unacceptable to manufacturer and consumer alike. Problems resulting from erratic electrical conductivity between anode and negative current collector have been matters of particularly great concern since the industry reduced or eliminated mercury from the anode mix used in primary alkaline cells.

Another problem that can affect alkaline cells is that the zinc and the electrolyte can separate, concentrating the zinc and reducing the amount of electrolyte available for the anodic reaction at the zinc surfaces. One method for preventing this problem is to increase the viscosity of the gelled anode. However, there are practical limits on raising the viscosity, as discussed below.

As one solution to the problems associated with shock sensitivity, U.S. Pat. No. 4,963,447 (Nishimura) describes a gelled zinc anode containing a granular crosslinking-type branched polyacrylic or polymethacrylic acid gelling agent having a main particle diameter of 200 to 900 microns which concentrates the zinc into a reduced volume. According to U.S. Pat. No. 4,963,447, the gelling agent particles are crosslinked in the presence of a mixture of a polyvalent allyl crosslinking agent with a polyvalent vinyl crosslinking agent which are then granulated during or after deposition-polymerization. U.S. Pat. No. 4,963,447 carefully recites the importance of both the particular combination of crosslinking agents (col. 3) and of the polymerization method (cols. 1 and 2). Gelling agents of comparable size obtained after mass polymerization, suspension polymerization, or emulsion polymerization are described therein to be inadequate as gelling agents because they fail to contain a sufficient volume of electrolyte and because the electrolyte is insufficiently utilized.

Although the polyacrylic and polymethacrylic acid large particle gelling agents of U.S. Pat. No. 4,963,447 were an improvement over prior gelling agents, it is now recognized that inability to control the nature of the particles results in undesired properties in gelled anodes of alkaline cells. In particular, such gelling agents increase the viscosity of the gelled anode to a high level. High viscosity materials are disfavored in battery production processes because they make it difficult to regulate the amount of the gelled anode loaded into the anodic cavity of the alkaline cell. However, at suitable lower viscosities, detrimental effects are noted, such as a zinc-electrolyte separation, decreased zinc network robustness and decreased electrical discharge performance.

Loading of a high viscosity gelled anode into the anodic cavity of a cell at high applied stress rates is easier if the gelled anode is a non-Newtonian fluid whose viscosity decreases as the rate of applied stress increases. Although a gelled anode seems stiff when at rest, it liquifies and flows easily when a stress is applied at a high rate. This concept, referred to as "shear thinning," was applied to battery anodes by Meltzer and Krebs in U.S. Pat. No. 3,207,633. As was noted by Meltzer and Krebs, the effect of shear thinning is increased, and handling during alkaline cell manufacture is improved at lower viscosities.

The manner in which the gelling agent acts to push zinc particles into spaces among its swollen particles to promote contact among the zinc particles, or between the zinc particles and the negative electrode current collector, is understood. Use of gelled anodes has been shown to improve electricity production, but existing batteries are still subject to loss of contact when dropped or vibrated. There is still considerable room for improvement in both of these areas, particularly in view of the desire to further eliminate toxic materials from primary cells. Such toxic materials as mercury had previously been used to improve cell performance and reduce shock sensitivity.

The industry has also seen an increased demand for use of such cells in high-current environments, including portable audio equipment and cameras and flashes where cells are likely to discharge faster than in previous applications and are more sensitive to erratic internal resistance.

Thus, a suitable gelling agent capable of maintaining better electrical conductivity in a gelled anode while having an acceptable viscosity lower than that previously believed necessary to maintain a superior zinc network and offer improved electrical discharge performance is highly desirable. It is also desirable that a longer battery life be achieved in combination with the other desired advantages.

BRIEF SUMMARY OF THE INVENTION

The invention has certain objects. That is, this invention provides solutions to problems existing in the prior art. For example, the invention provides a gelled anode that, when compared to existing gelled anodes: (a) reduces material costs; (b) maintains its integrity in manufacturing processes; (c) achieves superior electrical discharge performance; (d) has improved anode network robustness; (e) is less subject to separation; (f) has increased reliability and physical robustness; and (g) is suitable for cells of any size that utilize gelled anodes.

The gelling agents suitable for use in the gelled anode of the present invention provide better shock sensitivity than prior gelling agents. Thus, gelled anodes prepared as described herein are more readily and more reproducibly incorporated into alkaline cells. A gelled anode prepared in accordance with the present invention can comprise additional gelling agents with superior results than are realized in the absence of the gelling agent described herein.

In its most basic embodiment, the invention is the recognition that a crosslinked sodium polyacrylate superabsorbent polymer made by a bulk polymerization method and characterized as described herein is a superior gelling agent when provided at a suitable concentration in a gelled anode for a primary alkaline cell.

The invention is also a gelled anode comprising effective amounts of an alkaline electrolyte, a zinc powder, water and a gelling agent composed solely or mainly of the described sodium polyacrylate polymer in a suitable concentration. Optionally, the anode can contain added indium hydroxide or surfactant in suitable concentration.

The invention is also a primary alkaline cell comprising the gelled anode of the present invention. Incorporation of such a gelled anode into an alkaline cell results in the cell that exhibits superior anode network robustness and acceptable electrical discharge performance.

In addition, the invention is a method for forming the gelled anode of the present invention, and is a method for forming, and a method for discharging, the primary alkaline cell of the present invention.

It is a feature of the gelled anode of the present invention that it includes a crosslinked acrylic superabsorbent polymer gelling agent characterized as having carboxylic groups located on the spine of the polymer which solvate in the presence of an aqueous medium and develop mutually repulsive negative charges which cause uncoiling of the molecule, exposure of additional carboxylic groups, and absorption of additional liquid.

The invention possess certain advantages, including its simplicity, the low cost of the gelling agent, and the small number of modifications required to implement the invention in a gelled anode and in an alkaline electrochemical cell.

Other objects, features, and advantages of the invention will become apparent from the detailed description of the invention taken in conjunction with the accompanying drawing.

DETAILED DESCRIPTION OF THE INVENTION

Figure 1:
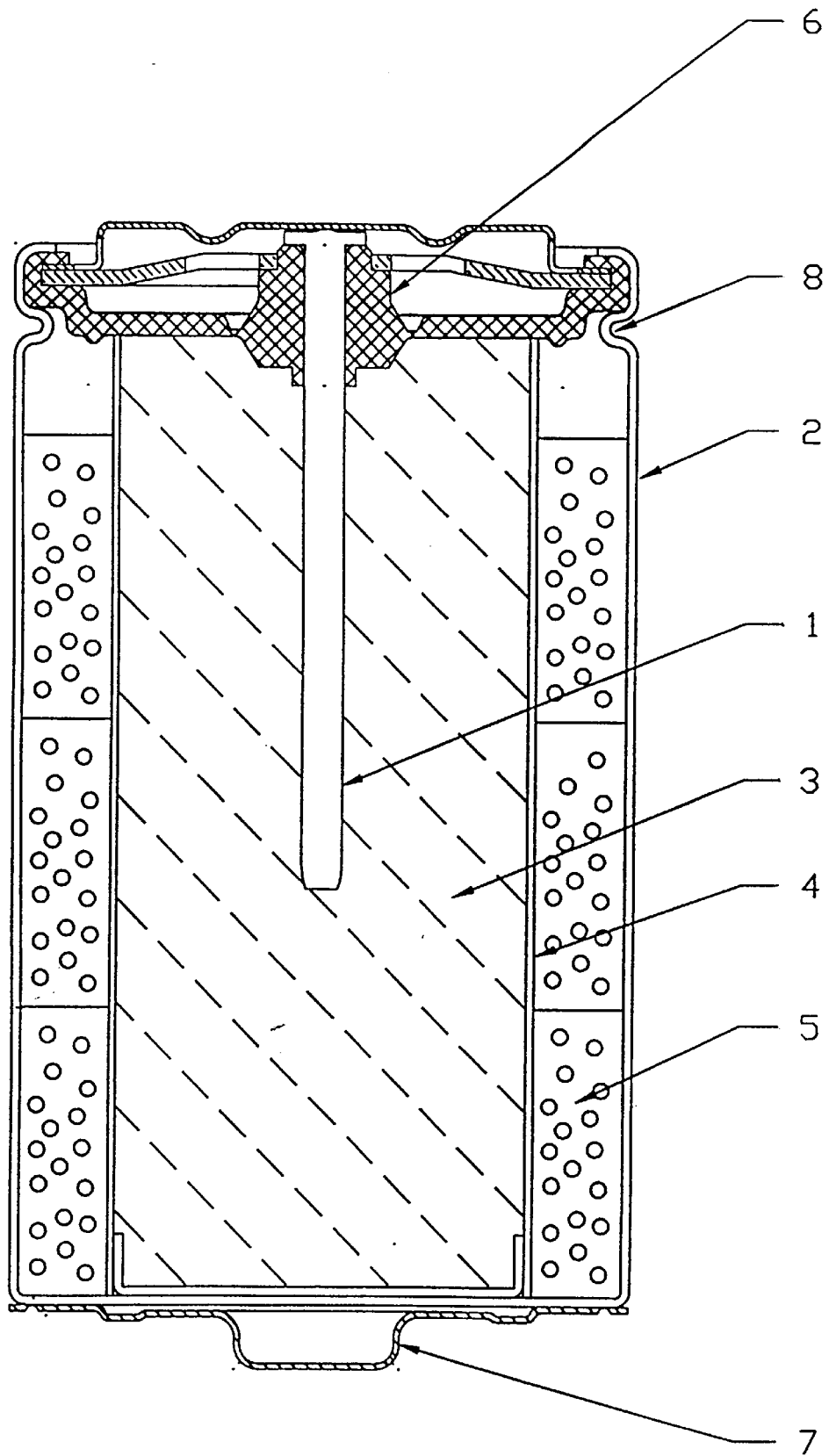
FIG. 1 is a drawing of an alkaline cell incorporating the present invention.

FIG. 1 is a cross-sectional diagram of an alkaline cylindrical battery incorporating the present invention. The battery includes a positive current collector 2, which is a drawn steel container open on one end that is about 0.012 inches thick. Three cathode annular rings 5 are placed into the positive current collector, forming a pressure contact with the positive current collector 2. A bead 8 is rolled into the container near the open end to support the sealing disk. A separator 4 and an anode 3 are placed inside of the cathode rings 5. A sealing disk 6 containing a negative current collector 1 is placed into the open end of the container and in contact with the bead. The open end of the container is crimped over the sealing disk thus compressing the sealing disk between the crimp and the bead to seal the cell. Terminal cap 7 is welded onto the positive current collector 2. Although a cylindrical cell is shown, the invention may be applied equally well to any primary alkaline cell, without regard to size or shape, including, but not limited to, sizes AA, AAA, C, D, and 9V.

The invention relates more particularly to the anode 3, which is a gelled zinc anode. The gelled zinc anode can be formed by first combining the electrolyte and a gelling agent of the type described herein to form a gelled electrolyte and then adding an effective amount of the zinc powder to the gelled electrolyte. A suitable gelled anode contains "fish eyes" and has a density of between 2.6 and 3.0 g/cm$^3$, preferably between 2.80 and 2.95 g/cm$^3$, and a viscosity between 300,000 and 500,000 cps at 0.50 rpm and between 15,500 and 21,000 cps at 50 rpm, as measured by a Brookfield viscometer model RVT with spindle #7 (used for viscosity values throughout the specification). "Fish eyes," which are named for their resemblance to fish eyes, are small swollen, insoluble particles of gelling agent which have absorbed electrolyte that help to maintain adequate contact between the anode and the negative current collector and among the zinc particles.

The zinc powder preferably has an added mercury content of less than 0.1% by weight and is most preferably mercury-free. The gelled anode also preferably contains no added lead. A Bismuth-Indium-Calcium (BIC) zinc alloy such as is described in U.S. Pat. No. 5,312,476, which is incorporated herein by reference, is suitable. The zinc component is generally about 65–68% by weight of the anode.

As is described in U.S. Pat. No. 5,168,018, incorporated herein by reference, an amount of an indium compound such as indium hydroxide adequate to effectively reduce corrosion and to promote electrical conductivity can also be provided in the gelled anode. An amount effective to promote electrical conductivity is an amount wherein a statistically significant increase ($p < 0.005$) in conductivity is observed in the presence of indium hydroxide over what is observed in the absence of indium hydroxide. An effective amount of indium hydroxide in the gelled anode can be less than 0.1% by weight but is preferably less than 0.05% and is most preferably 0.03%.

The alkaline electrolyte can be any electrolyte of the type known and used in the production of gelled zinc anodes and alkaline cells. The choice of electrolyte is thought to have no advantageous or disadvantageous effect upon the present invention. A suitable aqueous alkaline electrolyte is 37% potassium hydroxide/4% zinc oxide, which is a typical electrolyte in alkaline dry cells. The electrolyte is provided at about 32–34% by weight, preferably about 33%, in the anode.

An effective amount of a surfactant can be added to the anode to reduce or control gassing within the cell, in the manner provided in U.S. Pat. No. 5,128,222, incorporated herein by reference. A suitable surfactant concentration is less than 0.1%, is preferably less than 0.05% and is most preferably 0.03% or less. Other surfactant choices are known to the art, and can include those surfactants described in U.S. Pat. No. 5,128,222.

The gelling agent is, generally speaking, a cross-linked acrylic polymer. As noted, the use of a particular class of cross-linked acrylic polymer gelling agents in a gelled anode is known. See, U.S. Pat. No. 4,963,447, which is incorporated herein by reference. However, the present inventors have determined that the objects of the present invention are achieved by providing an effective amount of a distinct class of crosslinked polyacrylate superabsorbent polymer resin gelling agents having the properties described herein which can be prepared by bulk polymerization. These same objects are not met by the gelling agents of U.S. Pat. No. 4,963,447.

There is no suggestion in U.S. Pat. No. 4,963,447 (Nishimura) that these particular materials would be advantageously employed in an alkaline cell. By its very terms, in fact, U.S. Pat. No. 4,963,447 teaches away from the beneficial use of such materials in the context of an alkaline cell, in that it recites that the starting materials and polymers described therein are critical to successful use.

A preferred large particle gelling agent, referred to herein as the preferred superabsorbent polymer (SAP), is characterized as an internally crosslinked, white, free-flowing granular powder characterized as having a bulk density of greater than 0.70 and typically 0.75, an average free swell capacity of greater 180 g 0.9% saline solution per g superabsorbent polymer (preferably greater than 200 g/g) in the free swell determination test described herein, a maximal moisture content of 5%, 200 or fewer ppm of residual acrylate monomer, and a particle size distribution of between 90 and 850 microns, when measured by sieve analysis. For comparison, the bulk densities (g/cc) of similar, but distinct, materials are presented: Aridall 1460—0.40; Sunfresh DK100—0.65; Junlon PT20—0.30 to 0.50. The free swell capacity can be at least as high as 250 g saline per gram, but might be higher.

The granular particles have flat angular surfaces when viewed under a light microscope at low power. The surfaces appear mechanically cut from a larger mass of solid polymeric material, rather than formed by aggregation of smaller particles, and thus have a lower exposed surface area. The preferred SAP is insoluble in water and organic solvents. The preferred SAPs are commercially available from Allied Colloids (Sulfolk, Va.) under the trade names Salsorb CL10, CL15, and CL20. A most preferred SAP is CL15. The applicants cannot unambiguously assign the advantageous performance of these materials to a unique attribute.

In any event, the results presented below demonstrate the fact of the superior performance of these materials in a gelled anode particularly with regard to reduced shock sensitivity in a drop test. The applicants herein disclose the information available to it concerning the composition of the Salsorb materials. The exact compositions and methods of manufacture are maintained as trade secrets by Allied Colloid. The applicants believe that the Salsorb super absorbents are neither patented nor prepared according to a patented process.

The preferred SAPs are also characterized by direct comparison to the crosslinked polymers described in U.S. Pat. No. 4,703,067 which have been employed in gelled anodes of primary alkaline cells with better performance results than are observed using the crosslinked materials of U.S. Pat. No. 4,963,447. In side by side tests, the material of U.S. Pat. No. 4,703,067, which is also a superabsorbent, exhibited less shock resistance than the preferred superabsorbent polymers of the present invention. Throughout this application, references to an anode comprising the prior gelling agent, or to the gelling agent of the prior art refer to materials produced under U.S. Pat. No. 4,703,067 and sold under the trade name ARIDALL 1460 by Chemdal Corporation. The gelled anode of the control and test cells were otherwise identical and contained Carbopol 940.

The preferred superabsorbent gelling agent also provides improved consistency over prior large particle gelling agents prepared by deposition polymerization using different starting materials. When incorporated as a gelling agent into a gelled zinc anode of the present invention, the resin improves the shock sensitivity and the zinc network robustness of primary alkaline cells by between 10% and 50%, which improvement is dramatic, unexpected, and commercially significant in this field. A suitable gelled anode prepared according to the present invention retains at least 40% of initial amperage after a drop test, and preferably retains between 50% and 90% of initial amperage (on average, where at least five samples are tested). As is disclosed in the Examples below, the gelling agent can be substituted directly for the prior gelling agent in a gelled anode. Acceptable performance levels and improved shock resistance are observed. Performance improvement can be observed on high-rate tests.

It is believed that the unexpectedly superior gelling properties observed with the gelling agent described herein result in part from the increased and improved accessibility of the electrolyte to carboxyl groups on the polymer backbone relative to that observed when the gelling agent is the prior gelling agent or is Carbopol 940. The increased accessibility may result from the manner in which the polymer chains of the prior gelling agent are crosslinked. It is thought that the ability of the particles of the polymer to efficiently trap and slowly release aqueous electrolyte over time contributes to the observed improvement in performance after storage. It has been determined that approximately 60% of the monovalent cations on the preferred SAPs are available to bind electrolyte and water, as opposed to other superabsorbents known to the inventors, which have 20% or fewer available cationic sites. Improved shock resistance is also observed because the gelled preferred SAPs trap little if any air in the polymer. This is manifest in the high density of gelled anodes made from the preferred SAPs and in the fact that the gelled material is clear, not turbid or translucent. Such turbidity is caused by trapped air. While the desire to reduce air in the gelled anode is known, previous efforts have required post-gelation treatment to remove air (see, e.g., WO 96/23581, which discloses a complex method and apparatus for deaerating and densifying a gelled anode by vacuum pumping). Such methods are unexpectedly eliminated by employing the preferred SAPs in an alkaline cell as disclosed herein. No deaeration or vacuum pumping is required when these materials are used. Thus, processing costs (including time and handling) are reduced over those of prior methods.

The superiority of these gelling agents is not simply a matter of a routine choice of one superabsorbent material over another. The present inventors have undertaken rigorous analysis of a number of recognized superabsorbent materials and have determined that all superabsorbents are not adequate gelling agents, and moreover that mere substitution of one superabsorbent for another does not result in anodes having comparable performance. It would necessary to modify, in an unpredictable manner, the other components in the anode to achieve desired performance when using other superabsorbents. It appears that the class of non-starch superabsorbent materials are superior to other starch-grafted co-polymers (described in U.S. Pat. No. 4,455,358) which are known to be less stable and which can be oxidized by the cathode.

The gelling agent thus characterized can be the sole gelling agent in the zinc anode or can be included in combination with one or more additional gelling agents of the type commonly used in the art. The gelling agent can be provided in the anode at a concentration range of about 0.15% to about 1.0% by weight of the anode, depending upon whether the agent is the sole gelling agent or is provided with another gelling agent. Combinations of preferred gelling agents can also be provided. It is envisioned that by adjusting the concentrations of other components of the gelled anode in a manner known to those skilled in the art it will be possible to extend the upper and lower suitable gelling agent amounts by about 5 or 10% of the range. When the gelled anode includes only one or more of the gelling agents characterized herein as "preferred," the gelling agent is present at between about 0.15% and about 0.9% by weight in the gelled anode, more preferably at a between 0.2% and 0.8%, and most preferably at about 0.3 to 0.6% of the weight of the gelled anode. Within these ranges, the gelled anode thus formed contains no unblended ingredients and exhibits no electrolyte separation, yet includes "fish eyes" and has a viscosity suitable for automated delivery during production of primary alkaline cells which is which is generally in the range of about 2.6 to 3.0 g/cm$^3$. At concentrations above about 1.0%, the gelled anode becomes too viscous for use in cell assembly processes. At concentrations below about 0.15%, the gel separates and anode stability cannot be maintained.

The characterized gelling agent can, alternatively, exhibit the same advantageous properties when present in combination with one or more additional gelling agents. When provided in combination, the combined percentage of the gelling agents should preferably be less than about 1%. For example, the preferred SAP(s) can be provided at 0.6% or less of the gelled anode by weight when Carbopol 940 absorbent is also present at less than 0.5% by weight. Carbopol 940 is a crosslinked acrylic acid copolymer used in anode gelling agents, that is an absorbent gelling agent, but is not a superabsorbent. If the SAP is provided in combination with gelling agent having a lower viscosity than Carbopol, the acceptable amount may be higher. Other Carbopols, other small-particle gelling agents, such as those described by Meltzer and Krebs, as well as other polyacrylic or cellulosic gelling agents including, for example, PW 150, sodium carboxymethylcellulose, hydroxymethylcellulose or hydroxyethylcellulose may also be combined with the gelling agent of the present invention to yield superior gelled anodes.

When Carbopol 940 is provided at about 0.5% in the anode, (e.g., 0.48%), the preferred SAP is preferably provided at between 0.15 and 0.6%, preferably at between 0.19% and 0.4%, and most preferably at 0.19–0.3% by weight in the anode.

When Carbopol 940 is provided at about 0.5%, for example 0.48%, the other gelling agent should be provided at between 0.19% and 0.5% to obtain suitable viscosity and performance. At lower concentrations of the preferred SAP, reduced anode stability is observed. At higher concentrations, increased viscosity interferes with effective anode processing.

From rigorous testing it has been determined that an optimal gelled zinc anode comprises the gelling agent of the present invention at about 0.30% by weight of the anode weight along with 0.32% Carbopol 940. This optimal formulation balances both the desired electrical performance and shock properties of the cell as well as the manufacturing process requirements for placing a gelled anode into an alkaline cell.

In summary, the compounds described herein are better suited for use as gelling agents in alkaline primary cells than gelling agents described in U.S. Pat. No. 4,703,067 because they are more readily and inexpensively produced, because they have a more stable three-dimensional structure, and because they provide superior performance (measured in a discharge test) and shock resistance (measured in a drop test). These advantages in a primary alkaline cell would have been unpredictable from the prior patent which does not contemplate use of a superabsorbent as a gelling agent for an alkaline cell.

The present invention can be more fully understood by reference to the following examples, which are intended to be exemplary and are not intended in any way to limit the scope of the invention.

EXAMPLES

The free swell capacities of Salsorb CL15, Aridall 1460, and Sunfresh superabsorbent powder for 0.9% saline were compared by separately sealing a known amount of each inside a saline-permeable container of known weight and sufficient size to avoid limiting the expansion of the powder. The containers were formed of battery separator paper.

The sealed containers were submerged a 0.9% NaCl solution for twenty minutes at which time the containers were drained of excess saline for one minute and weighed. After correcting for the weight of the containers, the following free swell capacities were observed, in two trials:

| Superabsorbent | Free swell capacity (g/g) |
|---|---|
| Salsorb | 193.70 |
|  | 225.58 |
|  | avg: 209.64 |
| Aridall 1460 | 142.99 |
|  | 141.64 |
|  | avg: 142.31 |
| Sunfresh | 148.99 |
|  | 160.26 |
|  | avg: 154.62 |

In the following examples, LR03 (AAA) and LR6 (AA) cells were prepared, as noted, using gelled anodes prepared as described herein. Common to all the gelled zinc anodes of all cells, unless otherwise noted, were an alkaline electrolyte composed of potassium hydroxide, BIC (Bismuth-Indium-Calcium) zinc powder, water, and surfactant, and indium hydroxide, present at standard concentrations as described above. The concentrations of other components in the gelled anode were adjusted proportionally. Carbopol 940 was purchased from B. F. Goodrich.

The following standard tests were performed on cells produced:

LR03: LR03 cells prepared using the described gelled anodes were tested in a standard ANSI 3.6 Ohm Photoflash test wherein each tested cell energized an electrical circuit having a 3.6 Ohm load placed thereacross, such load simulating a typical device load. The average number of photoflash discharge cycles (1 cycle=15 second discharge across 3.6Ω load per minute) needed to reach an indicated endpoint after storage under the indicated conditions was determined. Throughout this application, if no storage conditions are indicated, the cells were fresh cells kept at room temperature. Otherwise, the number of weeks of storage and the storage temperature are specified. This test simulates a camera flash application and is predictive of the trend in the industry toward higher current drain ("high rate") applications.

LR03 cells were also tested in tests that measure the hours to an indicated endpoint voltage when continuously energizing an electrical circuit having a defined load placed thereacross or a defined current passing through.

Results for each endpoint voltage are averages of 5 cells/test.

In the Examples the control number and CL15 number identify distinct lots of control gelled anodes and gelled anodes containing CL15 gelling agent, respectively. When like lot numbers appears in different tests, the same lot was used in both tests. All lots nominally have the same composition.

TABLE I

LR03 Cells 3.6 Ohm
Photoflash test (cycles)

| Test | Endpoint | Control #1 | CL15 #1 | Control #2 | CL15 #2 |
|---|---|---|---|---|---|
| | 3.6 Ohm Photoflash (cycles) | | | | |
| No Delay | | | | | |
| | 1.200 V | 119 | 133 | | |
| | 1.100 V | 291 | 289 | 270 | 283 |
| | 1.000 V | 469 | 448 | 455 | 482 |
| | 0.901 V | 639 | 658 | 636 | 634 |
| 4 Weeks 130° F. (54° C.)/Ambient Relative Humidity | | | | | |
| | 1.200 V | 83 | 78 | | |
| | 1.100 V | 196 | 203 | | |
| | 1.000 V | 368 | 373 | | |
| | 0.901 V | 609 | 622 | | |

LR6: LR6 cells prepared using the described gelled anodes were tested in a standard ANSI 1.8 Ohm Photoflash test wherein each tested cell energized an electrical circuit having a 1.8 Ohm load placed thereacross, such load simulating a typical device load. The average number of photoflash discharge cycles (1 cycle=15 second discharge across 1.8Ω load per minute) needed to reach an indicated endpoint after storage under the indicated conditions was determined. This test simulates a camera flash application and is predictive of the trend in the industry toward higher current drain ("high rate") applications.

This cycle was repeated for each cell until the closed circuit voltage of the cell reached a suitable closed circuit voltage end point, generally 1.1, 1.0, 0.9, or 0.8 volts. When the final end point was reached, the test for those cells was terminated. The measured value (cycles to end point) is a measure of the cells capacity.

LR6 cells were also tested in tests that measure the hours to an indicated endpoint when continuously energizing an electrical circuit having a defined load placed thereacross or a defined current passing through.

Results for each endpoint voltage are averages of 5 cells/test.

TABLE II

LR06 Cells
(NO DELAY)

| Test | Endpoint | Control #4 | CL15 #4 | Control #5 | CL15 #5 | Control #6 | CL15 #6 |
|---|---|---|---|---|---|---|---|
| 1.8 Ohm | Photoflash (cycles) | | | | | | |
| | 1.100 V | 192 | 195 | 198 | 199 | 213 | 206 |
| | 1.000 V | 410 | 441 | 380 | 360 | 396 | 410 |
| | 0.900 V | 619 | 617 | 633 | 631 | 645 | 630 |
| 3.9 Ohm | 1 hr/day | | | | | | |
| | 1.100 | 3.04 | 2.98 | 3.59 | 3.55 | 3.03 | 3.38 |
| | 1.000 V | 5.03 | 5.29 | 4.9 | 4.86 | 5.33 | 5.38 |
| | 0.900 V | 6.05 | 6.29 | 5.92 | 5.99 | 6.34 | 6.44 |
| | 0.800 V | 6.82 | 7.17 | 6.82 | 6.85 | 6.97 | 7.3 |
| 1.0 Ohm | Photoflash (cycles) | | | | | | |
| | 1.100 V | | 46 | 54 | 56 | 48 | |
| | 1.000 V | | 97 | 107 | 112 | 103 | |
| | 0.901 V | | 164 | 168 | 184 | 184 | |

4 Weeks 130° F.(54° C.)/
Ambient Relative Humidity

| Test | Endpoint | Control #1 | CL15 #1 | Control #2 | CL15 #2 | Control #3 | CL15 #3 |
|---|---|---|---|---|---|---|---|
| 1.8 Ohm | Photoflash (cycles) | | | | | | |
| | 1.100 V | | | | | 148 | 150 |
| | 1.000 V | | | | | 296 | 280 |
| | 0.900 V | | | | | 564 | 546 |

| Test | Endpoint | Control #4 | CL15 #4 | Control #5 | CL15 #5 | Control #6 | CL15 #6 |
|---|---|---|---|---|---|---|---|
| 3.9 Ohm | 1 hr/day | | | | | | |
| | 1.100 V | | | | | 2.61 | 2.54 |
| | 1.000 V | | | | | 4.68 | 4.63 |
| | 0.900 V | | | | | 6.03 | 6.03 |
| | 0.800 V | | | | | 6.88 | 7.12 |
| 1.0 Ohm | Photoflash (cycles) | | | | | | |
| | 1.100 V | | | | | 23 | 33 |
| | 1.000 V | | | | | 58 | 74 |
| | 0.901 V | | | | | 112 | 129 |

The following tests were performed on all cell types:

Drop test: The initial amperage of each cell was measured and recorded at 20° C. Each battery was dropped 5 times from a height of 102 cm. The amperage is checked again on each battery and the "post drop" amperage is compared to the initial amperage. The results are presented as the percentage of the initial amperage. Drop test results represent a measure of the robustness of the zinc network.

TABLE III

Cell Drop Test
Control Vs Salsorb CL15

| LR6 | % of Initial Amperage |
|---|---|
| Control #4 | 61% |
| CL15 #4 | 82% |

TABLE III-continued

Cell Drop Test
Control Vs Salsorb CL15

| | |
|---|---|
| Control #7 | 2% |
| CL15 #7 | 32% |
| Control #6 | 43% |
| CL15 #6 | 52% |
| Control #10 | 35% |
| CL15 #8 | 43% |
| Control #11 | 40% |
| CL15 #9 | 54% |
| Control #12 | 65% |
| CL15 #10 | 76% |
| Control #12 | 54% |
| CL15 #11 | 66% |
| Average Control | 43% |
| Average CL15 | 58% |

| LR03 | % of Initial Amperage |
|---|---|
| Control #1 | 13% |
| CL15 #1 | 33% |
| Control #2 | 33% |
| CL15 #2 | 63% |
| Average Control | 23% |
| Average CL15 | 48% |

Density: The densities of various gelled anodes were determined, as shown in Table III. The data of Table III demonstrate a higher density in cells containing the preferred gelling agent relative to control gelled anodes.

TABLE IV

LR6/LR03
Control Vs Salsorb CL15

| LR6 | Density gm/cc |
|---|---|
| Control #4 | 2.79 |
| CL15 #4 | 2.88 |
| Control #6 | 2.82 |
| CL15 #6 | 2.88 |
| Control #7 | 2.81 |
| CL15 #7 | 2.86 |
| Average Density | |
| Control | 2.81 |
| CL15 | 2.87 |

| LR03 | Density gm/cc |
|---|---|
| Control #1 | 2.83 |
| CL15 #1 | 2.88 |
| Control #3 | 2.80 |
| CL15 #3 | 2.8 |
| Average Density | |
| Control | 2.82 |
| CL15 | 2.89 |

Test and control LR6 cells were subjected to use in telephones and pocket televisions which are high-current devices typically encountered in the marketplace.

As is shown in Table V, the performance of test cells was comparable or superior to that of control cells.

TABLE V

LR6 Device Testing
Control Vs Salsorb CL15

Telephone Test (Motorola Tele-T-A-C 200)
6 LR6 Cells per unit, continuous discharge to 5.6 volts Control

| | |
|---|---|
| Trial 1 | 3.1 hours |
| Trial 2 | 2.97 hours |
| Trial 3 | 2.78 hours |
| Average 2.95 hours | |

Salsorb CL15

| | |
|---|---|
| Trial 1 | 3.45 hours |
| Trial 2 | 2.03 hours |
| Trial 3 | 2.72 hours |
| Average 3.07 hours | |

Pocket TV (Radio Shack Pocket Vision 31)
4 LR6 Cells per unit, Continuous discharge to 3 volts Control

| | |
|---|---|
| Trial 1 | 3.08 hours |
| Trial 2 | 2.85 hours |
| Trial 3 | 2.85 hours |
| Average 2.93 hours | |

Salsorb CL15

| | |
|---|---|
| Trial 1 | 3.12 hours |
| Trial 2 | 3.00 hours |
| Trial 3 | 2.90 hours |
| Average 3.01 hours | |

The present invention is not intended to be limited to the exemplified embodiments, but rather to encompass all such variations and modifications as come within the scope of the following claims.

I/We claim:

1. A gelled anode for use in an alkaline electrochemical cell, the gelled anode comprising:
   an aqueous alkaline electrolyte;
   a zinc powder; and
   a gelling agent consisting essentially of a single sodium polyacrylate superabsorbent polymer characterized as a white, free flowing granular powder having a typical bulk density of 0.75, a free swell capacity of greater than 180 grams of saline solution per gram, a maximal moisture content of 5%, 200 or fewer ppm of residual acrylate monomer, and a particle size distribution of between 90 and 850 microns.

2. A gelled anode as claimed in claim 1 wherein the electrolyte comprises potassium hydroxide.

3. A gelled anode as claimed in claim 1 wherein the zinc powder comprises 1% or less by weight of mercury.

4. A gelled anode as claimed in claim 3 wherein the zinc powder comprises no added mercury.

5. A gelled anode as claimed in claim 1 wherein the zinc powder comprises no added lead.

6. A gelled anode as claimed in claim 1 wherein the zinc powder comprises bismuth, indium and calcium.

7. A gelled anode as claimed in claim 1 further comprising indium hydroxide in an amount effective to promote electrical conductivity and to reduce corrosion.

8. A gelled anode as claimed in claim 1 further comprising a surfactant in an amount effective to reduce gassing in an alkaline electrochemical cell comprising the gelled anode.

9. A gelled anode as claimed in claim 1 wherein the polymer gelling agent is present at between 0.22 and 1.1% by weight of the gelled anode.

10. A gelled anode as claimed in claim 1 wherein the polymer gelling agent is present at between 0.7 and 1.0% by weight of the gelled anode.

11. A gelled anode as claimed in claim 1 wherein the polymer gelling agent is present at between 0.8 and 0.9% by weight of the gelled anode.

12. An alkaline electrochemical cell comprising:

a positive current collector;

a cathode in contact with the positive current collector;

a gelled zinc anode inside the cathode, the anode comprising an aqueous alkaline electrolyte, a zinc powder, and a gelling agent consisting essentially of a single sodium polyacrylate superabsorbent polymer characterized as a white, free flowing granular powder having a typical bulk density of 0.75, a free swell capacity of greater than 180 grams of saline solution per gram, a maximal moisture content of 5%, 200 or fewer ppm of residual acrylate monomer, and a particle size distribution of between 90 and 850 microns;

a separator between the cathode and the anode; and a negative current collector in electrical contact with the anode.

13. An alkaline electrochemical cell as claimed in claim 12 wherein the electrolyte is potassium hydroxide.

14. An alkaline electrochemical cell as claimed in claim 12 wherein the zinc powder comprises 1% or less by weight of mercury.

15. An alkaline electrochemical cell as claimed in claim 14 wherein the zinc powder comprises no added mercury.

16. An alkaline electrochemical cell as claimed in claim 12 wherein the zinc powder comprises no added lead.

17. An alkaline electrochemical cell as claimed in claim 12 wherein the zinc powder comprises bismuth, indium and calcium.

18. An alkaline electrochemical cell as claimed in claim 12 further comprising indium hydroxide in an amount effective to promote electrical conductivity and to reduce corrosion.

19. An alkaline electrochemical cell as claimed in claim 12 further comprising a surfactant in an amount effective to reduce gassing in an alkaline electrochemical cell comprising the alkaline electrochemical cell.

20. An alkaline electrochemical cell as claimed in claim 12 wherein the polymer gelling agent is present at between 0.22 and 1.1% by weight of the alkaline electrochemical cell.

21. An alkaline electrochemical cell as claimed in claim 12 wherein the polymer gelling agent is present at between 0.7 and 1.0% by weight of the alkaline electrochemical cell.

22. An alkaline electrochemical cell as claimed in claim 12 wherein the polymer gelling agent is present at between 0.8 and 0.9% by weight of the alkaline electrochemical cell.

23. A method for forming a gelled anode, the method comprising the steps of:

combining an aqueous alkaline electrolyte and a gelling agent consisting of a single sodium polyacrylate superabsorbent polymer in suitable quantity to form a gelled electrolyte, the gelling agent being characterized as a white, free flowing granular powder having a typical bulk density of 0.75, a free swell capacity of greater than 180 grams of saline solution per gram, a maximal moisture content of 5%, 200 or fewer ppm of residual acrylate monomer, and a particle size distribution of between 90 and 850 microns;

mixing a zinc powder into the gelled electrolyte to form a gelled anode.

24. A method as claimed in claim 23, further comprising the step of adding a suitable amount of indium hydroxide to the gelled electrolyte.

25. A method as claimed in claim 23, further comprising the step of adding a suitable amount of a surfactant to the gelled electrolyte.

26. A method for forming an alkaline electrochemical cell, the method comprising the steps of:

placing a cathode into a positive current collector open on one end so that the positive current collector contacts the cathode;

introducing a separator so that the separator contacts the cathode;

introducing a gelled anode comprising an aqueous alkaline electrolyte, an effective amount of a zinc powder, and a sodium polyacrylate superabsorbent polymer gelling agent characterized as a white, free flowing granular powder having a typical bulk density of 0.75, a free swell capacity of greater than 180 grams of saline solution per gram, a maximal moisture content of 5%, 200 or fewer ppm of residual acrylate monomer, a particle size distribution of between 90 and 850 microns, so that the gelled anode contacts the separator; and placing a negative current collector into the open end of the container so that the negative current collector contacts the gelled anode.

* * * * *